(12) United States Patent
Chan et al.

(10) Patent No.: US 8,888,899 B2
(45) Date of Patent: Nov. 18, 2014

(54) TRANSFER LINE FOR THE PRIMARY CYCLONE OF A GASIFIER

(75) Inventors: Iwan H. Chan, Houston, TX (US); Yongchao Li, Katy, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 327 days.

(21) Appl. No.: 13/445,655

(22) Filed: Apr. 12, 2012

(65) Prior Publication Data

US 2013/0269527 A1  Oct. 17, 2013

(51) Int. Cl.
*B01D 45/16* (2006.01)

(52) U.S. Cl.
USPC .................. 95/271; 55/345; 55/348; 55/349; 422/139; 422/140; 422/141; 422/142; 422/143; 422/144; 422/145; 422/146; 422/147

(58) Field of Classification Search
CPC ......... B01D 45/12; C10J 3/485; C10K 1/003; C10K 1/026
USPC .................. 55/345, 346, 349; 422/139–147; 48/197 R
See application file for complete search history.

(56) References Cited

U.S. PATENT DOCUMENTS

| | | | |
|---|---|---|---|
| 3,888,762 A * | 6/1975 | Gerhold | 208/120.01 |
| 3,901,660 A * | 8/1975 | Ohorodnik et al. | 422/140 |
| 4,601,814 A * | 7/1986 | Mauleon et al. | 208/113 |
| 4,961,907 A * | 10/1990 | Herbst et al. | 422/144 |
| 5,053,203 A * | 10/1991 | Mauleon et al. | 422/144 |
| 5,156,817 A * | 10/1992 | Luckenbach | 422/144 |
| 6,413,477 B1 * | 7/2002 | Govoni et al. | 422/131 |
| 6,846,463 B1 * | 1/2005 | Dries et al. | 422/147 |
| 6,911,504 B2 * | 6/2005 | Reiling | 526/68 |
| 7,160,518 B2 * | 1/2007 | Chen et al. | 422/147 |
| 7,544,333 B2 * | 6/2009 | Espeillac et al. | 422/142 |
| 7,879,119 B2 | 2/2011 | Abughazaleh | |
| 7,955,403 B2 | 6/2011 | Ariyapadi | |
| 7,955,496 B2 | 6/2011 | Iqbal | |
| 8,540,897 B1 * | 9/2013 | Abughazaleh et al. | 252/373 |
| 8,696,792 B2 * | 4/2014 | Henningsen et al. | 95/13 |
| 2003/0091485 A1 * | 5/2003 | Bierl et al. | 422/189 |
| 2003/0124034 A1 * | 7/2003 | Wu et al. | 422/139 |
| 2004/0024276 A1 * | 2/2004 | Smith et al. | 585/639 |
| 2004/0072971 A1 * | 4/2004 | Govoni et al. | 526/65 |
| 2007/0202027 A1 * | 8/2007 | Walker et al. | 423/215.5 |
| 2008/0145309 A1 * | 6/2008 | Bavarian et al. | 423/651 |
| 2008/0155899 A1 | 7/2008 | Ramamurthy | |
| 2008/0216655 A1 * | 9/2008 | Vimalchand et al. | 95/271 |

(Continued)

*Primary Examiner* — Robert Clemente
*Assistant Examiner* — Brittany Precht
(74) *Attorney, Agent, or Firm* — Gary M. Machetta (57) ABSTRACT

Systems and methods for gasifying a feedstock are provided. A gasifier can include a transfer line having a first leg and a second leg. A first end of the first leg can be adapted to be coupled to a cyclone and a second end of the first leg can be coupled to a first end of the second leg. The second end of the second leg can be adapted to be coupled to a standpipe. A centerline through the first leg can be oriented at an angle with a centerline through the second leg of from about 40° to about 140°.

20 Claims, 2 Drawing Sheets

(56) References Cited

U.S. PATENT DOCUMENTS

| | | |
|---|---|---|
| 2009/0188165 A1 | 7/2009 | Ariyapadi |
| 2011/0146152 A1 | 6/2011 | Vimalchand et al. |
| 2011/0210292 A1 | 9/2011 | Ariyapadi |
| 2012/0148484 A1* | 6/2012 | Gauthier et al. ........... 423/648.1 |
| 2012/0192711 A1* | 8/2012 | Henningsen et al. ............. 95/12 |
| 2013/0075072 A1* | 3/2013 | Kulprathipanja et al. .... 165/185 |
| 2013/0172173 A1* | 7/2013 | Mukthiyar et al. ............. 502/41 |
| 2014/0034134 A1* | 2/2014 | Fan et al. .......................... 137/1 |

* cited by examiner

FIG. 1

FIG. 2

TRANSFER LINE FOR THE PRIMARY CYCLONE OF A GASIFIER

BACKGROUND

1. Field

Embodiments described herein generally relate to gasifiers and methods for the gasification of carbonaceous material. More particularly, such embodiments relate to a gasifier having a transfer line disposed between a cyclone and a standpipe of the gasifier.

2. Description of the Related Art

Gasification is a high-temperature process that converts carbon-containing feedstocks into mostly gaseous mixtures, including carbon monoxide, carbon dioxide, hydrogen, and methane. These gaseous mixtures are typically referred to as synthesis gas or, more succinctly, syngas. Syngas can be used as a source of hydrogen, for the production of other organic chemicals, or to generate steam and/or electricity. Thus, gasification adds value to otherwise low-value feedstocks by converting them to marketable products.

Gasifiers include one or more cyclones adapted to separate and remove solid particulates from the syngas. The particulates can flow through a transfer line to a standpipe where they are recycled back into the system. Conventional transfer lines are in the shape of a block "U" such that the solid particulates flow downward through a first, vertical leg, sideways through a second, horizontal leg, and then upward through a third, vertical leg to reach the standpipe. Oftentimes, an aeration gas is introduced to the transfer line to fluidize the particulates so that they continue to flow therethrough. The aeration gas tends to collect in the top of the horizontal leg causing the particulates in the bottom of the horizontal leg to agglomerate and flow slower than intended or create a blockage.

There is a need, therefore, for an improved gasifier for the gasification of hydrocarbons.

DETAILED DESCRIPTION

Systems and methods for gasifying a feedstock are provided. A gasifier can include a transfer line having a first leg and a second leg. A first end of the first leg can be adapted to be coupled to a cyclone and a second end of the first leg can be coupled to a first end of the second leg. The second end of the second leg can be adapted to be coupled to a standpipe. A centerline through the first leg can be oriented at an angle with a centerline through the second leg of from about 40° to about 140°.

Figure 1:
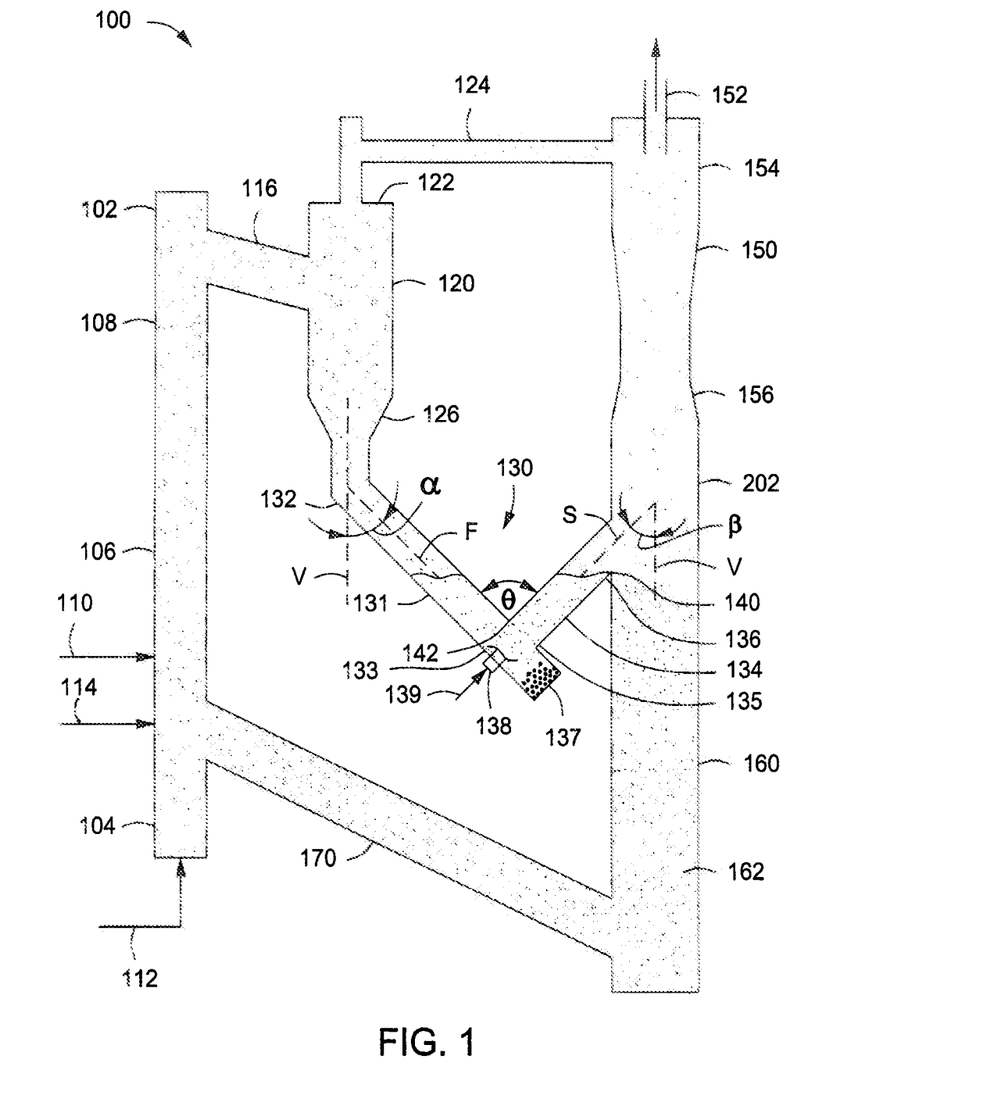
FIG. 1 depicts an illustrative gasifier, according to one or more embodiments described.

FIG. 1 depicts an illustrative gasifier 100, according to one or more embodiments. The gasifier 100 can include a riser 102, a first cyclone 120, a second cyclone 150, a standpipe 160, a substantially "V" or "L" shaped transfer line 130, and a recycle line 170. The riser 102 can include one or more first mixing zones 104, one or more second mixing zones 106, and one or more gasification zones 108.

The gasifier 100 can produce a raw syngas/particulate mixture via line 116 can be introduced to a first disengager or cyclone 120. The first cyclone 120 can be configured to separate at least a portion of the particulates from the syngas. The syngas ("first syngas stream") can flow out of a first end 122 of the first cyclone 120 and be introduced to one or more second cyclones 150 via line 124. The separated particulates ("first particulate stream") can flow out of a second end 126 of the first cyclone 120 and be introduced to the standpipe 160 via the "V" shaped seal leg or transfer line 130.

The "V" shaped transfer line 130 can include a first leg 131 and a second leg 134 that provide a path of fluid communication between the first cyclone 120 and the standpipe 160. The first leg 131 can be coupled to and extend from the first cyclone 120, and the second leg 134 can be coupled to and extend between the first leg 131 and the standpipe 160. More particularly, a first end 132 of the first leg 131 can be coupled to the first cyclone 120, and a second end 133 of the first leg 131 can be coupled to a first end 135 of the second leg 134. A second end 136 of the second leg 134 can be coupled to the standpipe 160. The intersection between the first and second legs 131, 134 can be a generally sharp turn, as shown, or the intersection can be curved.

After being discharged from the first cyclone 120, the particulates can flow "downward" through the first leg 131 toward the second leg 134. The particulates can then flow "upward" through the second leg 134 toward the standpipe 160. To facilitate the flow of the particulates through the "V" shaped transfer line 130, one or more nozzles 138 can introduce an aeration gas into the first leg 131 and/or the second leg 134. The aeration gas can serve to fluidize the particulates and prevent them from agglomerating and forming a blockage in the "V" shaped transfer line 130. For example, aeration gas can be introduced through the nozzle 138 in the direction 139 generally parallel with a centerline S through the second leg 134 and toward the standpipe 160.

In at least one embodiment, the first leg 131 can extend beyond the second leg 134 forming a clinker catcher 137 proximate the second end 133 of the first leg 131. Larger particles, refractories, or "clinkers" flowing through the transfer line 130 can become disposed within the clinker catcher 137, thereby preventing an interference or blockage from building up in the transfer line 130.

The first end 132 of the first leg 131 can be located above (with respect to vertical V) an exit point 140 proximate the second end 136 of the second leg 134. The exit point 140 can be the lowermost point (with respect to vertical V) at the second end 136 of the second leg 134 such that the particulates will flow into the standpipe 160 if the level of particulates rises above the exit point 140. Accordingly, the weight of the particulates flowing "downward" through first leg 131, at least in part, can cause the particulates to flow "upward" through the second leg 134, over the exit point 140, and into the standpipe 160.

Furthermore, the exit point 140 can be located above (with respect to vertical V) a low point 142 at the top of the intersection between the first and second legs 131, 134. Thus, when the particulates are flowing through the first and second legs 131, 134 and into the standpipe 160, the level of the particulates in the first and second legs 131, 134 can be above the low point 142. For example, the level of the particulates in the second leg 134 can be at about the level of the exit point 140, and the level of the particulates in the first leg 131 can be at or above the level of the exit point 140. As may be appreciated, by maintaining the level of the particulates in the first and second legs 131, 134 above the low point 142, the particulates can prevent the syngas from passing through the "V" shaped transfer line 130.

A centerline F through the first leg 131 can be vertical V or oriented at an angle $\alpha$ with respect to vertical V of between about 1°, about 5°, about 10°, about 20°, or about 30° and about 60°, about 70°, or about 80°. For example, the first leg 131 can be oriented at an angle α between about vertical (0°) and about 70°, between about 1" and about 70°, between about 20° and about 70°, about 30° and about 60°, or about 40° and about 50° with respect to vertical V. The centerline S through the second leg 134 can be oriented at an angle β with respect to vertical V of between about 10°, about 20°, or about 30° and about 60°, about 70°, or about 80°. For example, the second leg 134 can be oriented at an angle β between about 20° and about 70°, about 30° and about 60°, or about 40° and about 50° with respect to vertical V. As such, an angle θ between the centerlines F, S of the first and second legs 131, 134 can be between about 20°, about 40°, or about 60° and about 120°, about 140°, and about 160°. For example, the angle θ can be between about 40° and about 140°, about 60° and about 120°, about 70° and about 110°, or about 80° and about 100°.

The first leg 131 can be longer than the second leg 134, as shown; however, as may be appreciated, the second leg 134 can be longer than the first leg 131, or the legs 131, 134 can be about the same length. The "V" shaped transfer line 130 can have a shorter overall length than conventional transfer lines in the shape of a block "U." Further, the length of the standpipe 160 can be reduced when used in conjunction with the "V" shaped transfer line 130. In at least one embodiment, the transfer line 130 can be in an "L" shape and rotated clockwise or counterclockwise between about 0°, about 10°, about 20°, about 30°, about 40°, about 50°, about 60°, or more.

Referring back to the second cyclone 150, the syngas ("first syngas stream") can be received via line 124 from the first cyclone 120. The second cyclone 150 can be configured to separate at least a portion of the remaining particulates from the syngas. Syngas via line 152 ("second syngas stream") can then flow out of a first end 154 of the second cyclone 150.

The syngas in line 152 can contain about 85 vol % or more carbon monoxide and hydrogen with the balance being primarily carbon dioxide and methane. The syngas in line 152 can contain about 90 vol % or more carbon monoxide and hydrogen, about 95 vol % or more carbon monoxide and hydrogen, about 97 vol % or more carbon monoxide and hydrogen, or about 99 vol % or more carbon monoxide and hydrogen. The carbon monoxide content of the syngas in line 152 can range from a low of about 10 vol %, about 20 vol %, or about 30 vol % to a high of about 50 vol %, about 70 vol %, or about 85 vol %. For example, the carbon monoxide content of the syngas in line 152 can range from a low of about 15 vol %, about 25 vol %, or about 35 vol % to a high of about 65 vol %, about 75 vol %, or about 85 vol %. The hydrogen content of the syngas in line 152 can range from a low of about vol %, about 5 vol %, or about 10 vol % to a high of about 30 vol %, about 40 vol %, or about 50 vol %. For example, the hydrogen content of syngas in line 152 can range from about 20 vol % to about 30 vol %.

The syngas in line 152 can contain less than about 25 vol %, less than about 20 vol %, less than about 15 vol %, less than about 10 vol %, or less than about 5 vol % of combined nitrogen, methane, carbon dioxide, water, hydrogen sulfide, and hydrogen chloride. The carbon dioxide content of the syngas in line 152 can be about 25 vol % or less, about 20 vol % or less, about 15 vol % or less, about 10 vol % or less, about 5 vol % or less, about 3 vol % or less, about 2 vol % or less, or about 1 vol % or less. The methane content of the syngas in line 152 can be about 15 vol % or less, about 10 vol % or less, about 5 vol % or less, about 3 vol % or less, about 2 vol % or less, or about 1 vol % or less. The water content of the syngas in line 152 can be about 40 vol % or less, about 30 vol % or less, about 25 vol % or less, about 20 vol % or less, about 15 vol % or less, about 10 vol % or less, about 5 vol % or less, about 3 vol % or less, about 2 vol % or less, or about 1 vol % or less. The syngas in line 152 can be nitrogen-free or essentially nitrogen-free. For example, the syngas in line 152 can contain less than about 3 vol %, less than about 2 vol %, less than about 1 vol %, or less than about 0.5 vol % nitrogen.

The syngas in line 152 can have a heating value, corrected for heat losses and dilution effects, ranging from a low of about 1,863 kJ/m³ (50 Btu/scf), about 2,794 kJ/m³ (75 Btu/scf), about 3,726 kJ/m³ (100 Btu/scf), about 4,098 kJ/m³ (110 Btu/scf), about 5,516 kJ/m³ (140 Btu/scf), or about 6,707 kJ/m³ (180 Btu/set) to a high of about 7,452 kJ/m³ (200 Btu/scf), about 9,315 kJ/m³ (250 Btu/scf), about 10,264 kJ/m³ (275 Btu/scf), about 11,178 kJ/m³ (300 Btu/scf), about 13,041 kJ/m³ (350 Btu/set), or about 14,904 kJ/m³ (400 Btu/scf).

Referring again back to the second cyclone 150, the separated particulates ("remaining particulate stream") can flow out of a second end 156 thereof and be combined with the particulates ("first particulate stream") from the "V" shaped transfer line 130 in the standpipe 160. The particulates from the first and second cyclones 120, 150 can accumulate within the standpipe 160 and form a bed of particulates or "solids bed" 162 therein. The particulates can be transferred via a j-leg or recycle line 170 from the standpipe 160 to a first mixing zone 104, a second mixing zone 106, and/or a gasification zone 108 of a riser 102. The height and/or density of the solids bed 162 within the standpipe 160 can influence the circulation rate of the recycled particulates via line 170.

A feedstock via line 110 can be introduced to the first mixing zone 104, the second mixing zone 106, and/or the gasification zone 108. Similarly, an oxidant via line 112 can be introduced to the first mixing zone 104, the second mixing zone 106, and/or the gasification zone 108. The feedstock via line 110 and oxidant via line 112 can be injected separately into the gasifier 100, as shown, and/or introduced as a mixture (not shown). The feedstock via line 110 and oxidant via line 112 can be injected sequentially or simultaneously into the gasifier 100.

As used herein, the term "feedstock" refers to one or more raw materials, whether solid, liquid, gas, or any combination thereof. For example, the feedstock can include one or more carbonaceous materials. Examples of a suitable carbonaceous materials can include, but are not limited to, biomass (i.e., plant and/or animal matter or plant and/or animal derived matter); coal (high-sodium and low-sodium lignite, lignite, subbituminous, and/or anthracite, for example); oil shale; coke; tar; asphaltenes; low ash or no ash polymers; hydrocarbons, hydrocarbon-based polymeric materials; biomass derived material; or by-product derived from manufacturing operations. Examples of suitable hydrocarbon-based polymeric materials can include, but are not limited to, thermoplastics, elastomers, rubbers, including polypropylenes, polyethylenes, polystyrenes, including other polyolefins, homo polymers, copolymers, block copolymers, and blends thereof; PET (polyethylene terephthalate), poly blends, polyhydrocarbons containing oxygen; heavy hydrocarbon sludge and bottoms products from petroleum refineries and petrochemical plants such as hydrocarbon waxes; blends thereof, derivatives thereof, and combinations thereof.

The feedstock in line 110 can include a mixture or combination of two or more carbonaceous materials (i.e., carbon-containing materials). The feedstock in line 110 can include a mixture or combination of two or more low ash or no ash polymers, biomass derived materials, or by-products derived from manufacturing operations. The feedstock in line 110 can include one or more carbonaceous materials combined with one or more discarded consumer products, for example, carpet and/or plastic automotive parts/components including bumpers and dashboards. Such discarded consumer products can preferably be reduced in size to fit within the gasifier 100. Accordingly, the systems and methods discussed and described herein can be useful for accommodating mandates for proper disposal of previously manufactured materials.

The particular type and/or amount of oxidant introduced via line 112 to the gasifier 100 can influence the composition and/or physical properties of the syngas and hence, the downstream products made therefrom. Illustrative oxidants can include, but are not limited to, air, oxygen, essentially oxygen, oxygen-enriched air, mixtures of oxygen and air, mixtures of oxygen and one or more other gases such as syngas, mixtures of oxygen and one or more inert gases, for example, nitrogen and/or argon. The oxidant in line 112 can contain about 60 vol % oxygen or more, about 70 vol % oxygen or more, about 80 vol % oxygen or more, about 90 vol % oxygen or more, about 95 vol % oxygen or more, or about 99 vol % volume oxygen or more. As used herein, the term "essentially oxygen" refers to an oxygen stream containing more than 50 vol % oxygen. As used herein, the term "oxygen-enriched air" refers to a gas mixture containing about 21 vol % to 50 vol % oxygen. Oxygen-enriched air and/or essentially oxygen can be obtained, for example, from cryogenic distillation of air, pressure swing adsorption, membrane separation, or any combination thereof. The oxidant in line 112 can be nitrogen-free or essentially nitrogen-free. As used herein, the term "essentially nitrogen-free" refers to an oxidant that contains about 5 vol % nitrogen or less, about 4 vol % nitrogen or less, about 3 vol % nitrogen or less, about 2 vol % nitrogen or less, or about 1 vol % nitrogen or less.

One or more sorbents via line 104 can optionally be introduced to the gasifier 100. The sorbent can be added to capture contaminants, such as sodium vapor, within the gasifier 100. The sorbent can also be used to dust or coat feedstock and/or ash particles in the gasifier 100 to reduce the tendency for the particles to agglomerate. The sorbent can be ground to an average particle size of about 5 µm to about 100 µm or about 10 µm to about 75 µm. Examples of suitable sorbents include, but are not limited to, limestone, dolomite, and coke breeze.

Once the gasifier 100 reaches an operating state, the feedstock via line 110 can be directed, fed, or otherwise introduced to the riser 102 and at least partially gasified therein to produce the raw syngas/particulate mixture via line 116. The operating temperature of the first and/or second mixing zones 104, 106 in the riser 102 can range from about 200° C., about 400° C., or about 600° C. to about 800° C., about 1,000° C., or about 1,200° C. For example, the temperature of the first and/or second mixing zones 104, 106 can range from about 600° C. to about 1,200° C., from about 700° C. to about 1,100° C., or from about 800° C. to about 1,000° C. The gasification zone 108 can operate at a higher temperature than second mixing zone 106. Suitable temperatures in the gasification zone 108 can range from about 300° C. to about 1,200° C. The operating pressures of the first and/or second mixing zones 104, 106 can range from about 0 kPa to about 5,000 kPa to increase thermal output per unit reactor cross-sectional area and enhance energy output in the subsequent power cycle. For example, the first and/or second mixing zones 104, 106 can be operated at pressures from about 1,000 kPa to about 5,000 kPa, from about 1,000 kPa to about 4,000 kPa, or from about 1,000 kPa to about 3,000 kPa.

Figure 2:
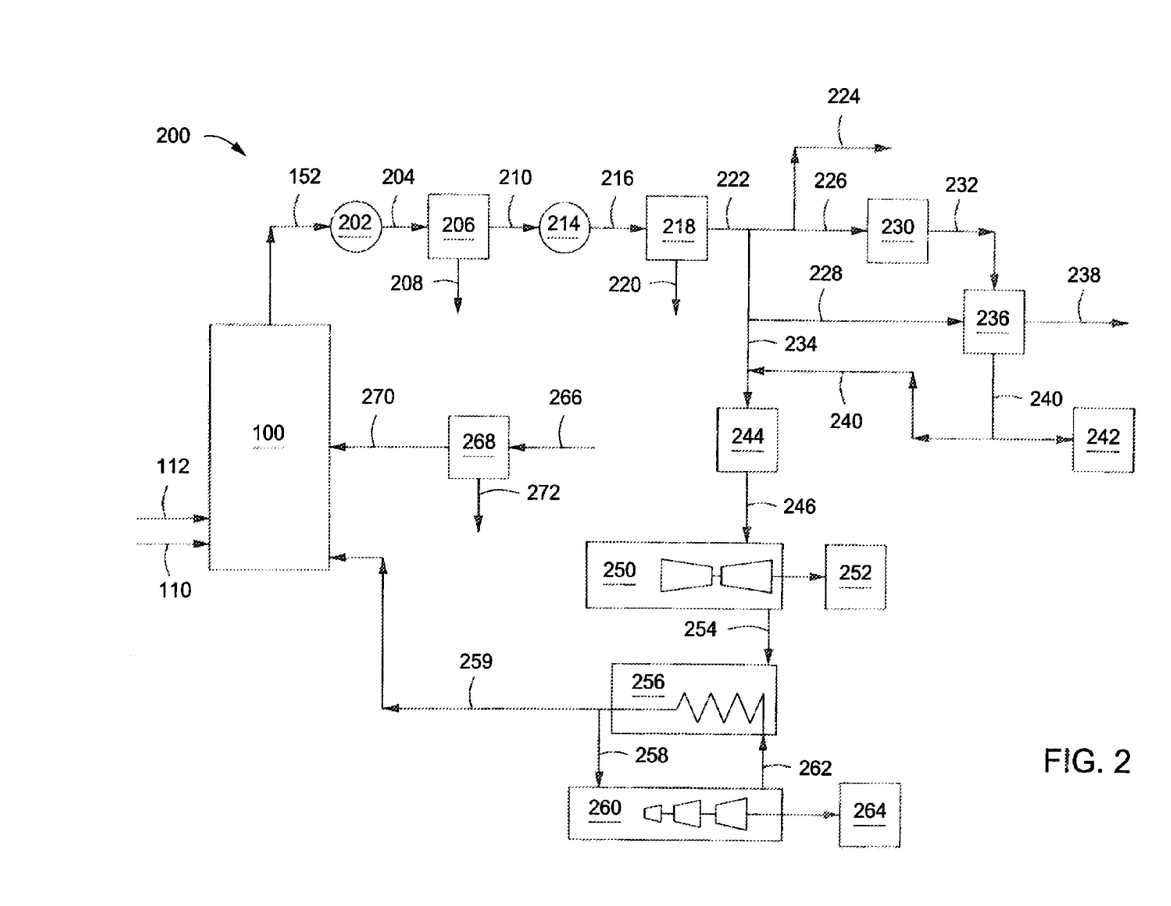
FIG. 2 depicts an illustrative gasification system, according to one or more embodiments described.

FIG. 2 depicts an illustrative gasification system 200, according to one or more embodiments. The gasification system 200 can include one or more gasifiers 100, particulate removal systems 206, and gas purification systems 218 to produce a treated synthesis gas ("syngas") via line 222 that includes about 85% or more of combined carbon monoxide and hydrogen with the balance being primarily carbon dioxide and methane. The gasification system 200 can also include one or more gas converters 230, hydrogen separators 236, fuel cells 242, combustors 244, gas turbines 250, waste heat boilers 256, steam turbines 260, generators (two are shown 252 and 264), and air separation units ("ASU") 268.

The syngas or raw syngas via line 152 from the gasifier 100 can be cooled within a cooler 202 ("primary cooler") to provide a cooled raw syngas via line 204 prior to introduction to the particulate removal system 206. For example, the raw syngas via line 152 can be cooled to about 350° C. or less, about 300° C. or less, about 250° C. or less, about 200° C. or less, or about 150° C. or less. In at least one embodiment, the raw syngas via line 152 can bypass the cooler 202 and be introduced directly to the particulate removal system 206, resulting in hot gas particulate removal at a temperature of about 550° C. to about 1,100° C.

The particulate removal system 206 can be used to partially or completely remove any remaining particulates from raw syngas via line 152 to provide particulates via line 208 and a separated syngas via line 210. The particulate removal system 206 can include one or more separation devices, for example conventional disengagers and/or cyclones (not shown). Particulate control devices ("PCD") capable of providing an outlet particulate concentration below the detectable limit of about 0.1 parts per million by weight (ppmw) can also be used. Examples of suitable illustrative PCDs include, but are not limited to, sintered metal filters, metal filter candles, and/or ceramic filter candles (for example, iron aluminide filter material).

The solid particulates via line 208 can be recycled (not shown) to the gasifier 100 or purged from the system, as shown. The separated syngas via line 210 can be cooled using one or more coolers 214 ("secondary cooler") to provide a cooled, separated syngas via line 216. The cooled, separated syngas via line 216 can have a temperature of about 350° C. or less, for example about 150° C. to about 300° C.

The cooled, separated syngas via line 216 can be treated within the gas purification system 218 to remove contaminants and to provide a waste gas via line 220 and a treated syngas via line 222. The gas purification system 218 can include any system, process, and/or device capable of removing at least a portion of any sulfur and/or sulfur-containing compounds contained in the cooled, separated syngas in line 216. For example, the gas purification system 218 can include a catalytic gas purification system that can include, but is not limited to, catalytic systems using zinc titanate, zinc ferrite, tin oxide, zinc oxide, iron oxide, copper oxide, cerium oxide, or mixtures thereof. In another example, the gas purification system 218 can include a process-based gas purification system that can include, but is not limited to, the Selexol™ process, the Rectisol® process, the CrystaSulf® process, and the Sulfinol® Gas Treatment Process.

The gas purification system 218 can use an amine solvent such as methyl-diethanolamine (MDEA) to remove acid gas from the cooled, separated syngas via line 216. Physical solvents, for example Selexol™ (dimethyl ethers of polyethylene glycol) or Rectisol® (cold methanol), can also be used. If the cooled, separated syngas via line 216 contains carbonyl sulfide (COS), the carbonyl sulfide can be converted by hydrolysis to hydrogen sulfide by reaction with water over a catalyst and then absorbed using the methods described above. If the cooled, separated syngas via line 216 contains mercury, the mercury can be removed using a bed of sulfur-impregnated activated carbon.

A cobalt-molybdenum ("Co—Mo") catalyst can be incorporated into the gas purification system 218 to perform a sour shift conversion of the syngas. The Co—Mo catalyst can operate at a temperature of about 300° C. in presence of $H_2S$, for example, about 100 ppmw $H_2S$. If a Co—Mo catalyst is used to perform a sour shift, subsequent downstream removal of sulfur can be accomplished using any of the above described sulfur removal methods and/or techniques.

At least a portion of the treated syngas in line 222 can be removed from the system via line 224 and sold as a commodity. At least a portion of the treated syngas in line 222 can be introduced via line 226 to the one or more gas converters 230. The gas converter 230 can be configured to convert the treated syngas via line 226 into Fischer-Tropsch ("F-T") products, chemicals, and/or feedstocks via line 232. The gas converter 230 can include a shift reactor (not shown) to adjust the hydrogen to carbon monoxide ratio ($H_2$:CO) of the synthesis gas by converting CO to $CO_2$. Within the shift reactor, a water-gas shift reaction can react at least a portion of the carbon monoxide in the treated syngas via line 226 with water in the presence of a catalyst and a high temperature to produce hydrogen and carbon dioxide. Examples of suitable shift reactors can include, but are not limited to, single stage adiabatic fixed bed reactors, multiple-stage adiabatic fixed bed reactors with interstage cooling, steam generation or cold quench reactors, tubular fixed bed reactors with steam generation or cooling, fluidized bed reactors, or any combination thereof. A sorption enhanced water-gas shift (SEWGS) process, utilizing a pressure swing adsorption unit having multiple fixed bed reactors packed with shift catalyst and at high temperature, e.g., a carbon dioxide adsorbent at about 480° C., can be used. Various shift catalysts can be employed.

The shift reactor can include two reactors arranged in series. A first reactor can be operated at high temperature (about 350° C. to about 400° C.) to convert a majority of the CO present in the treated syngas via line 226 to $CO_2$ at a relatively high reaction rate using an iron-chrome catalyst. A second reactor can be operated at a relatively low temperature (about 250° F. to about 350° F.) to complete the conversion of CO to $CO_2$ using a mixture of copper oxide and zinc oxide.

The recovered carbon dioxide from shift reactor can be used in a fuel recovery process to enhance the recovery of oil and gas. In an illustrative oil recovery process, carbon dioxide can be injected and flushed into an area beneath an existing well where "stranded" oil exists. The water and carbon dioxide removed with the crude oil can then be separated and recycled.

The F-T products produced by the gas converter 230 can include refinery/petrochemical feedstocks, transportation fuels, synthetic crude oil, liquid fuels, lubricants, alpha olefins, and waxes. The reaction can be carried out in any type of reactor, for example, fixed bed, moving bed, fluidized bed, slurry, or bubbling bed using copper, ruthenium, iron or cobalt based catalysts, or combinations thereof, under conditions ranging from about 190° C. to about 450° C. depending on the reactor configuration.

The F-T products can be liquids which can be shipped to a refinery site for further chemical reactions and upgrading to a variety of products. Certain products, for example C4-C5 hydrocarbons, can be high quality paraffin solvents which, if desired, can be hydrotreated to remove olefin impurities, or employed without hydrotreating to produce a wide variety of wax products. Cl6+ liquid hydrocarbon products can be upgraded by various hydroconversion reactions, for example, hydrocracking, hydroisomerization catalytic dewaxing, isodewaxing, or combinations thereof, to produce mid-distillates, diesel and jet fuels such as low freeze point jet fuel and high cetane jet fuel, isoparaffinic solvents, lubricants, for example, lube oil blending components and lube oil base stocks suitable for transportation vehicles, non-toxic drilling oils suitable for use in drilling muds, technical and medicinal grade white oil, chemical raw materials, and various specialty products.

The gas converter 230 can include a slurry bubble column reactor to produce the F-T product. The slurry bubble column reactor can operate at a temperature of less than about 220° C. and from a pressure of about 50 kPa to about 4,000 kPa, or about 1,500 kPa to about 2,500 kPa using a cobalt catalyst promoted with rhenium and supported on titania having a Re:Co weight ratio in the range of about 0.01 to about 1 and containing from about 2% wt to about 50% wt cobalt. The catalyst within the slurry bubble column reactor can include, but is not limited to, a titania support impregnated with a salt of a catalytic copper or an Iron Group metal, a polyol or polyhydric alcohol and, optionally, a rhenium compound or salt. Examples of suitable polyols or polyhydric alcohols include, but are not limited to, glycol, glycerol, derythritol, threitol, ribitol, arabinitol, xylitol, allitol, dulcitol, gluciotol, sorbitol, and mannitol. The catalytic metal, copper or Iron Group metal as a concentrated aqueous salt solution, for example cobalt nitrate or cobalt acetate, can be combined with the polyol and optionally perrhenic acid while adjusting the amount of water to obtain 15 wt % metal, for example, 15 wt % cobalt, in the solution and using optionally incipient wetness techniques to impregnate the catalyst onto rutile or anatase titania support, optionally spray-dried and calcined. This method reduces the need for rhenium promoter.

The gas converter 230 can be used to produce methanol, alkyl formates, dimethyl ether, ammonia, acetic anhydride, acetic acid, methyl acetate, acetate esters, vinyl acetate and polymers, ketenes, formaldehyde, dimethyl ether, olefins, derivatives thereof, and/or combinations thereof. For methanol production, for example, the Liquid Phase Methanol Process can be used to produce (LPMeOH™). In this process, the carbon monoxide in the syngas via line 226 can be directly converted into methanol using a slurry bubble column reactor and catalyst in an inert hydrocarbon oil reaction medium which can conserve heat of reaction while idling during off-peak periods for a substantial amount of time while maintaining good catalyst activity. Gas phase processes for producing methanol can also be used. For example, known processes using copper-based catalysts can be used.

For ammonia production, gas converter 230 can be adapted to operate known processes to produce ammonia. For alkyl formate production, for example, methyl formate, any of several processes wherein carbon monoxide and methanol are reacted in either the liquid or gaseous phase in the presence of an alkaline catalyst or alkali or alkaline earth metal methoxide catalyst can be used.

At least a portion of the converted gas via line 232 can be sold or upgraded using further downstream processes (not shown). At least a portion of converted gas via line 232 can be directed to the hydrogen separator 236. At least a portion of treated syngas in line 222 can bypass the gas converter 230 described above and can be introduced via line 228 directly to hydrogen separator 236. Although not shown in FIG. 2, carbon dioxide can be separated and/or recovered from the converted gas via line 232 via physical adsorption techniques. Examples of suitable adsorbents and techniques include, but are not limited to, propylene carbonate physical adsorbent solvent as well as other alkyl carbonates, dimethyl ethers of polyethylene glycol of two to twelve glycol units (Selexol™ process), n-methyl-pyrrolidone, sulfolane, and use of the sulfinol gas treatment process.

The hydrogen separator 236 can include any system or device to selectively separate hydrogen from syngas to provide a purified hydrogen and a waste gas. The hydrogen separator 236 can utilize pressure swing absorption, cryogenic distillation, and/or semi-permeable membranes. Examples of suitable absorbents include, but are not limited to, caustic soda, potassium carbonate or other inorganic bases, alkanes, and/or alkanolamines. The hydrogen separator 236 can provide a carbon dioxide rich fluid via line 238 and a hydrogen rich fluid via line 240. At least a portion of hydrogen rich fluid via line 240 can be used as a feed to a fuel cell 242.

In one embodiment, at least a portion of hydrogen rich fluid via line 240 can be combined with the treated syngas via line 234 to use as a fuel in the combustor 244. The combustor 244 can be configured to provide a high pressure/high temperature exhaust gas via line 246. The high pressure/high temperature exhaust gas via line 246 can be introduced to the gas turbine 250 to provide mechanical shaft power to drive an electric generator 252 and an exhaust gas via line 254. The exhaust gas via line 254 can be introduced to the waste heat boiler or heat recovery system 256 to provide steam via lines 258, 259. The steam via line 258 can be introduced to a steam turbine 260 to provide mechanical shaft power to drive the generator 264. The steam via line 259 can be introduced to gasifier 100, and/or other auxiliary process equipment. Lower pressure steam from steam turbine 260 can be recycled to heat recovery system 256 via line 262.

Essentially oxygen produced from the air separation unit ("ASU") 268 can be supplied to gasifier 100. For example, up to about 10 vol %, up to about 20 vol %, up to about 30 vol %, up to about 40 vol %, or up to about 50 vol % of the total oxidant fed to gasifier 100 can be supplied by ASU 268 via line 270. The ASU 268 can provide a nitrogen-lean and oxygen-rich fluid via line 270 to gasifier 100, thereby minimizing the nitrogen concentration in the system. The use of essentially oxygen allows gasifier 100 to produce raw syngas via line 152 that is essentially nitrogen-free, for example, containing less than 0.5% nitrogen/argon. The ASU 268 can be a high-pressure, cryogenic type separator that can be supplemented with air via line 266. Nitrogen via line 272 can be rejected or recovered from the ASU 268. The nitrogen via line 272 can be added to a combustion turbine and/or used as utility.

Embodiments described herein further relate to any one or more of the following paragraphs:

1. A transfer line in a gasifier, comprising: a first leg having a first end and a second end, wherein the first end of the first leg is adapted to be coupled to a cyclone; and a second leg having a first end and a second end, wherein the first end of the second leg is coupled to the second end of the first leg, and wherein the second end of the second leg is adapted to be coupled to a standpipe, wherein a centerline through the first leg is oriented at an angle with a centerline through the second leg of from about 40° to about 140°.

2. The transfer line of paragraph 1, wherein the centerline through the first leg is oriented at an angle between about vertical and about 70° with respect to vertical.

3. The transfer line according to paragraph 1 or 2, wherein the centerline through the second leg is oriented at an angle with respect to vertical of from about 20° to about 70°.

4. The transfer line according to any one of paragraphs 1 to 3, further comprising one or more nozzles configured to introduce an aeration gas into at least one of the first and second legs.

5. The transfer line of paragraph 4, wherein the aeration gas is introduced in a direction generally parallel to the centerline through the second leg and toward the standpipe.

6. The transfer line according to any one of paragraphs 1 to 5, wherein the first end of the first leg is located above an exit point proximate the second end of the second leg.

7. The transfer line of paragraph 6, wherein the exit point is located above a low point proximate an intersection between the first and second legs.

8. The transfer line according to any one of paragraphs 1 to 7, wherein the angle is between about 80° and about 100°.

9. The transfer line according to any one of paragraphs 1 to 8, further comprising a clinker catcher disposed proximate the second end of the first leg.

10. A system for gasifying a feedstock, comprising: a riser configured to receive and convert the feedstock into a mixture including syngas and particulates; a first cyclone configured to separate the mixture into a first syngas stream and a first particulate stream, wherein the first syngas stream includes remaining particulates; a second cyclone configured to separate the first syngas stream into a second syngas stream and a remaining particulate stream; a standpipe configured to receive the first particulate stream and the remaining particulate stream; a transfer line having a first leg coupled to the first cyclone and a second leg coupled to the standpipe, wherein a centerline through the first leg is oriented at an angle with a centerline through the second leg of from about 40° to about 140°, and wherein the transfer line is adapted to transfer the first particulate stream from the first cyclone to the standpipe; and a recycle line coupled to the standpipe and the riser and configured to transfer the particulates from the standpipe to the riser.

11. The system of paragraph 10, wherein the centerline through the first leg is oriented at an angle between about vertical and about 70° with respect to vertical, and the centerline through the second leg is oriented at an angle with respect to vertical of from about 20° to about 70°.

12. The system of paragraph 11, wherein a first end of the first leg is coupled to the cyclone and a second end of the second leg is coupled to the standpipe, and wherein the first end of the first leg is located above an exit point proximate the second end of the second leg.

13. The system of paragraph 12, wherein the exit point is located above a low point proximate an intersection between the first and second legs.

14. The system according to any one of paragraphs 10 to 13, further comprising one or more nozzles coupled to the transfer line and configured to introduce aeration gas therein.

15. A method for gasifying a feedstock, comprising: converting the feedstock into a mixture including syngas and particulates within a riser; separating the mixture into a first syngas stream and a first particulate stream within a first cyclone, wherein the first syngas stream includes remaining particulates; transferring the first particulate stream from the first cyclone to a standpipe through a transfer line, wherein a first leg of the transfer line is coupled to the first cyclone and a second leg of the transfer line is coupled to the standpipe, and wherein a centerline through the first leg is oriented at an angle with a centerline through the second leg of from about 40° to about 140°; separating the first syngas stream into a second syngas stream and a remaining particulate stream within a second cyclone; transferring the remaining particulate stream from the second cyclone to the standpipe; and recycling the particulates from the standpipe to the riser through a recycle line.

16. The method of paragraph 15, wherein the centerline through the first leg is oriented at an angle between about vertical and about 70° with respect to vertical, and the centerline through the second leg is oriented at an angle with respect to vertical of from about 20° to about 70°.

17. The method of paragraph 16, further comprising introducing an aeration gas into at least one of the first and second legs through one or more nozzles.

18. The method of paragraph 17, wherein the aeration gas is introduced in a direction generally parallel to the centerline through the second leg and toward the standpipe.

19. The method according to any one of paragraphs 15 to 18, wherein the first particulate stream in the transfer line prevents the first syngas stream from flowing therethrough.

20. The method according to any one of paragraphs 15 to 19, wherein a first end of the transfer line is coupled to the first cyclone and a second end of the transfer line is coupled to the standpipe, and wherein the first end is located above an exit point proximate the second end.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A transfer line in a gasifier, comprising:
   a first leg having a first end and a second end,
      wherein the first end of the first leg is coupled to a cyclone configured to separate solid particulates from a fluid, and
      wherein a centerline through the first leg is oriented at an angle with respect to vertical of about 20° to about 70°; and
   a second leg having a first end and a second end, wherein the first end of the second leg is coupled to the second end of the first leg, and wherein the second end of the second leg is coupled to a standpipe, wherein the centerline through the first leg is oriented at an angle with respect to a centerline through the second leg of from about 40° to about 140°.

2. The transfer line of claim 1, wherein the first end of the first leg is coupled to a second end of the cyclone and configured to receive the separated solid particulates.

3. The transfer line of claim 1, wherein the centerline through the first leg is oriented at an angle with respect to vertical of from about 30° to about 60°, wherein the center line through the first leg is oriented at an angle with respect to the centerline through the second leg of from about 60° to about 120°, and wherein the centerline through the second leg is oriented at an angle with respect to vertical of from about 20° to about 70°.

4. The transfer line of claim 1, further comprising one or more nozzles configured to introduce an aeration gas into at least one of the first and second legs.

5. The transfer line of claim 4, wherein the one or more nozzles is configured to introduce the aeration gas in a direction generally parallel to the centerline through the second leg and toward the standpipe.

6. The transfer line of claim 1, wherein the first end of the first leg is located above an exit point of the second end of the second leg.

7. The transfer line of claim 6, wherein the exit point is located above a low point of an intersection between the first and second legs.

8. The transfer line of claim 1, wherein the standpipe further comprises a solids bed at a position below the second end of the second leg.

9. The transfer line of claim 1, further comprising a clinker catcher disposed proximate the second end of the first leg.

10. A system for gasifying a feedstock, comprising:
    a riser configured to receive and convert the feedstock into a mixture including syngas and particulates;
    a first cyclone configured to separate the mixture into a first syngas stream and a first particulate stream, wherein the first syngas stream includes remaining particulates;
    a second cyclone configured to separate the first syngas stream into a second syngas stream and a remaining particulate stream;
    a standpipe configured to receive the first particulate stream and the remaining particulate stream;
    a transfer line having a first leg coupled to the first cyclone and a second leg coupled to the standpipe,
       wherein a centerline through the first leg is oriented at an angle with respect to vertical of about 20° to about 70°,
       wherein the centerline through the first leg is oriented at an angle with a centerline through the second leg of from about 40° to about 140°, and
       wherein the transfer line is adapted to transfer the first particulate stream from the first cyclone to the standpipe; and
    a recycle line coupled to the standpipe and the riser and configured to transfer the particulates from the standpipe to the riser.

11. The system of claim 10, wherein the centerline through the first leg is oriented at an angle between about 30° and about 60° with respect to vertical, and the centerline through the second leg is oriented at an angle with respect to vertical of from about 20° to about 70°.

12. The system of claim 11, wherein a first end of the first leg is coupled to the cyclone and a second end of the second leg is coupled to the standpipe, and wherein the first end of the first leg is located above an exit point of the second end of the second leg.

13. The system of claim 12, wherein the exit point is located above a low point of an intersection between the first and second legs.

14. The system of claim 10, further comprising one or more nozzles coupled to the transfer line and configured to introduce aeration gas therein.

15. A method for gasifying a feedstock, comprising:
    converting the feedstock into a mixture including syngas and particulates within a riser;
    separating the mixture into a first syngas stream and a first particulate stream within a first cyclone, wherein the first syngas stream includes remaining particulates;
    transferring the first particulate stream from the first cyclone to a standpipe through a transfer line, wherein a centerline through the first leg is oriented at an angle with respect to vertical of about 20° to about 70°, wherein a first leg of the transfer line is coupled to the first cyclone and a second leg of the transfer line is coupled to the standpipe, and wherein the centerline through the first leg is oriented at an angle with a centerline through the second leg of from about 40° to about 140°;

separating the first syngas stream into a second syngas stream and a remaining particulate stream within a second cyclone;

transferring the remaining particulate stream from the second cyclone to the standpipe; and recycling the particulates from the standpipe to the riser through a recycle line.

16. The method of claim 15, wherein the centerline through the first leg is oriented at an angle between about 30° and about 60° with respect to vertical, and the centerline through the second leg is oriented at an angle with respect to vertical of from about 20° to about 70°.

17. The method of claim 16, further comprising introducing an aeration gas into at least one of the first and second legs through one or more nozzles.

18. The method of claim 17, wherein the aeration gas is introduced in a direction generally parallel to the centerline through the second leg and toward the standpipe.

19. The method of claim 15, wherein the first particulate stream in the transfer line prevents the first syngas stream from flowing therethrough.

20. The method of claim 15, wherein a first end of the transfer line is coupled to the first cyclone and a second end of the transfer line is coupled to the standpipe, and wherein the first end is located above an exit point of the second end.

\* \* \* \* \*